Patented June 23, 1936

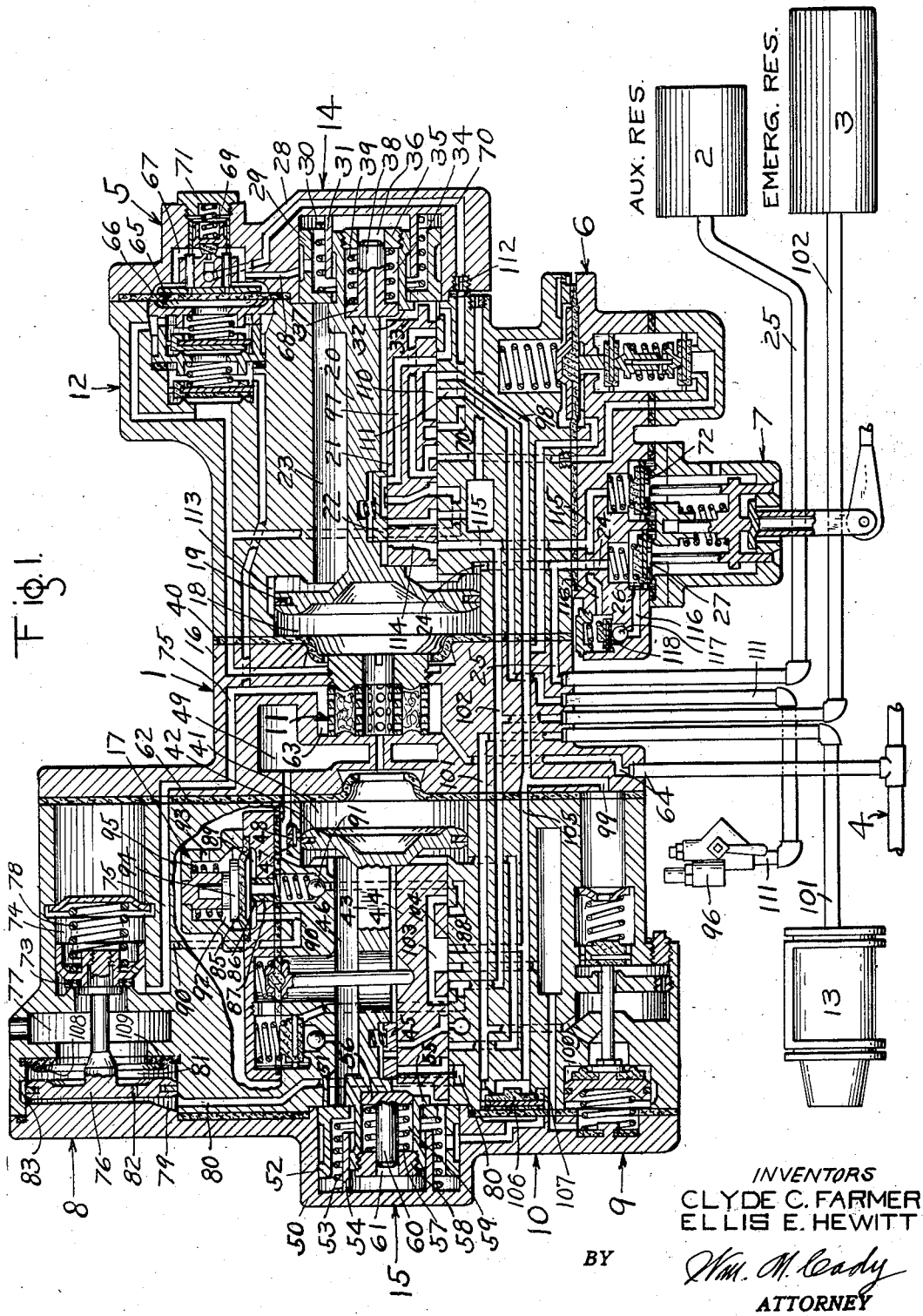

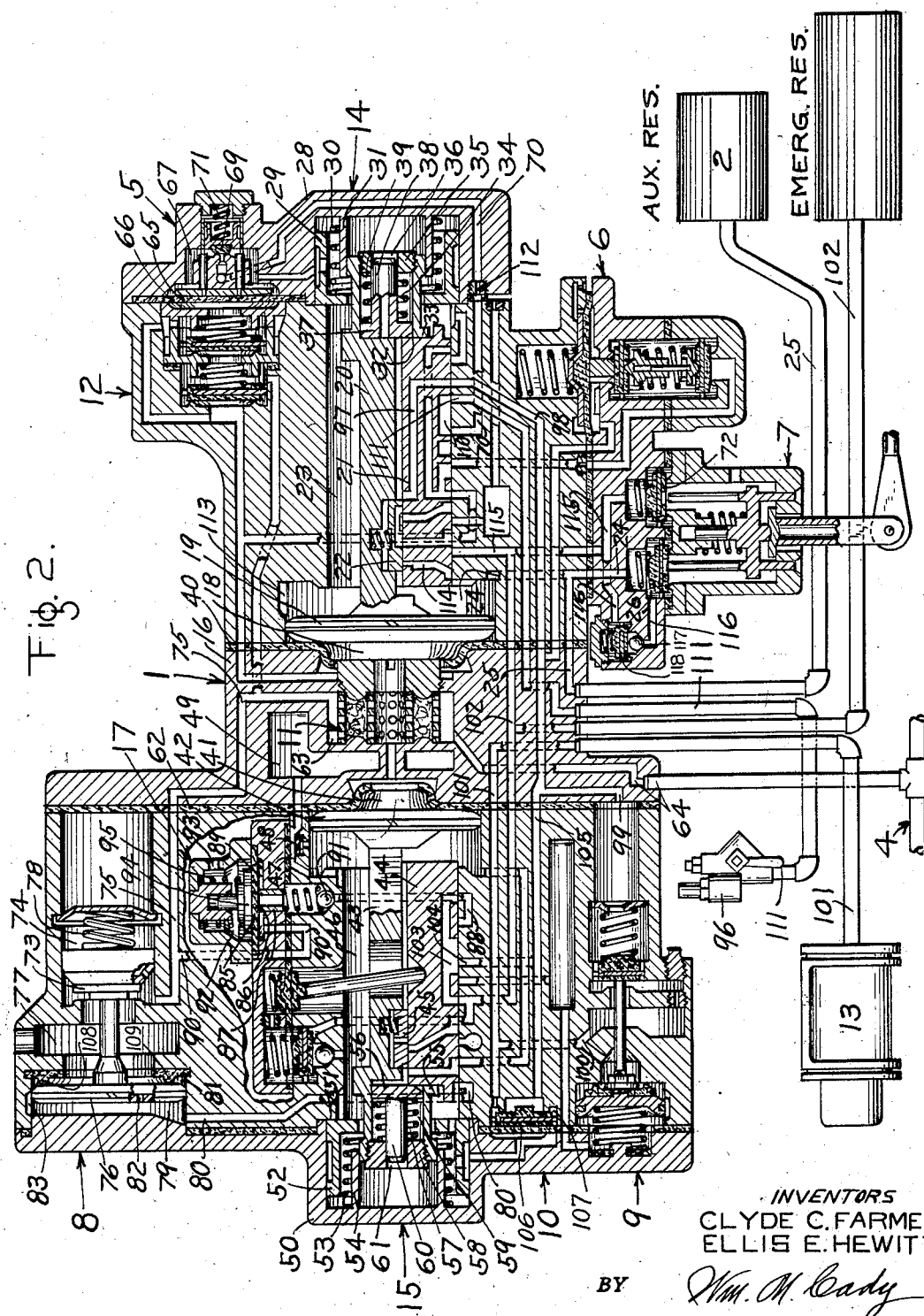

2,045,182

UNITED STATES PATENT OFFICE 2,045,182

FLUID PRESSURE BRAKE

Clyde C. Farmer, Pittsburgh, and Ellis E. Hewitt, Edgewood, Pa., assignors to The Westinghouse Air Brake Company, Wilmerding, Pa., a corporation of Pennsylvania Application November 11, 1933, Serial No. 697,666

18 Claims. (Cl. 303—36)

This invention relates to fluid pressure brake equipment for controlling the application and release of the brakes on cars of a railway train and more particularly to that type of equipment which is fully disclosed in an application of Clyde C. Farmer, filed May 29, 1932, Serial No. 612,465.

The type of fluid pressure brake equipment for railway cars, which until quite recently has been standard, was designed for handling trains of a length up to eighty cars. In recent years, however, trains of more than eighty cars have frequently been operated on various railroads.

As a consequence of the increased length of trains, it has become increasingly difficult to so control the brakes as to secure the prompt and reliable application and release of the brakes on all cars of the train. The fluid pressure brake equipment disclosed in the aforementioned Farmer application has been designed to, and does operate to overcome the difficulties encountered in long train operation where each car is equipped with this type of apparatus.

With the brake equipment embodying the features of the aforementioned Farmer application adopted by the railroads as standard, it is evident that owing to the large number of cars now equipped with the old standard brake equipment, there will be a transition period of time in which trains will comprise cars equipped with the old apparatus and cars equipped with the new apparatus. It will thus be apparent that in making up trains during the transition period, innumerable combinations of the old and new equipments will be formed.

Owing to the difficulty in releasing the brakes with the old standard brake equipment, it has been found that there are possible combinations of the old and improved brake equipments which will render it difficult to release the brakes after an emergency application of the brakes, such as where the rear cars are equipped with the new apparatus, due to the fact that the old standard equipment will function in releasing the brakes to materially retard the rate at which the brake pipe pressure is increased toward the rear of the train.

To make this point clear one unfavorable combination will be considered wherein the first fifty cars of a train of one hundred fifty cars are each equipped with the new fluid pressure brake equipment disclosed in the aforementioned Farmer application, each of the next fifty cars with the old standard fluid pressure brake equipment in which the K type of triple valve device is employed, and each of the last fifty cars with the new equipment.

In effecting an emergency application of the brakes on a train having the above disposition of equipments, the pressures of the auxiliary and emergency reservoirs and brake cylinders on the first and last fifty cars may equalize at approximately sixty pounds, and the pressures of the auxiliary reservoirs and brake cylinders on the remaining or middle fifty cars will equalize at approximately fifty-three pounds, the higher equalized pressure on the first and last fifty cars being due to the addition of the emergency reservoir volume to that of the auxiliary reservoirs and brake cylinders.

In releasing the brakes after an emergency application of the brakes, fluid under pressure is supplied to the brake pipe in the usual manner. At the front end of the train, the increase in brake pipe pressure will, as is well known, be at a rapid rate. This rapid increase in brake pipe pressure causes a sufficient differential to be created on the emergency pistons of the equipments on the first fifty cars to effect their prompt movement to inner release or back-dump position. The emergency main slide valves, which have been shifted to their back-dump position by the emergency pistons, establish communications through which fluid under pressure flows from the brake cylinders and auxiliary reservoirs to the brake pipe. As a consequence, the rate of increase in brake pipe pressure on the first fifty cars is accelerated and the brake cylinder and auxiliary reservoir pressures are reduced to around forty-five pounds.

Due to the great length and volume of the brake pipe on the middle fifty cars equipped with the old standard equipment, and to the frictional resistance offered by the brake pipe to the flow of fluid, the rate of recharge of the brake pipe will be gradually retarded toward the rear end of the train. The extent of this retardation may be such that, on the last fifty cars of the train, the increase in brake pipe pressure will be so slow that when the emergency pistons and emergency slide valves are returned to their normal release position, the rate of flow of fluid from the emergency piston chambers to the emergency valve chambers and connected quick action chambers will be such as to prevent a sufficient pressure differential from being created on the emergency pistons to cause the pistons and emergency slide valves to move to their inner release or back-dump position against the opposing pressure of the spring means which cooperate with the piston stems to define the normal release position of the emergency pistons and slide valves. As a result of this, the back-dump feature is, in effect, entirely eliminated on the last fifty cars of the train.

When the brake pipe pressure on the first fifty cars of the train has been increased to around forty-six pounds, the triple valve devices on these cars will be caused to move to release position, in which fluid under pressure is supplied from the brake pipe to both the auxiliary and emergency reservoirs. This has the effect of further retarding the rate of increase in brake pipe pressure on the last one hundred cars of the train.

When the brake pipe pressure on the middle fifty cars equipped with the K type of triple valve devices, has been increased to above fifty-four pounds, the triple valve pistons on these cars are caused to move to shift the triple valve slide valves to release position, in which fluid under pressure is supplied from the brake pipe to the auxiliary reservoirs. This recharge of the auxiliary reservoirs has the effect of still further retarding the rate of increase in brake pipe pressure on the last fifty cars of the train.

Now when the slowly increasing brake pipe pressure on the last fifty cars of the train and acting on one side of the triple valve pistons, approaches auxiliary reservoir pressure, acting on the other sides of these pistons, the stabilizing mechanisms carried by the piston stems act to move the pistons out of sealing engagement with the gaskets mounted in the triple valve casings. When the brake pipe pressure has been increased over auxiliary reservoir pressure, fluid may leak past the triple valve piston rings to the auxiliary reservoirs, and if the rate of increase in brake pipe pressure does not exceed the rate of such leakage, a sufficient fluid pressure differential cannot be created on the triple valve pistons to cause them to move to shift the slide valves to release position. As a result of this some or all of the brakes on the last fifty cars of the train may remain applied. This difficulty will not be overcome on the cars equipped with the release insuring valve device of the new equipment, since the device cannot operate to vent fluid from the auxiliary reservoir so long as the brake pipe and auxiliary reservoir pressures increase at substantially the same rate.

One object of the present invention is to provide novel means for eliminating the aforementioned difficulty in releasing an emergency application of the brakes.

According to the invention this object is attained by permitting fluid leaking past the triple valve piston to the valve chamber of the triple valve device to flow to both the auxiliary reservoir and emergency reservoir. With the volume of the emergency reservoir added to that of the auxiliary reservoir, leakage past the triple valve piston will not increase the pressure in the valve chamber nearly as fast as would be the case if the flow of fluid were to the auxiliary reservoir only, and due to this, on the cars where the rise in brake pipe pressure is slow, the creation of a sufficient fluid pressure differential to cause the triple valve piston and associated slide valves to move promptly to release position is insured.

In a train of cars in which the old and new equipments are disposed in the manner aforementioned, another difficulty may arise, namely, the accidental movement of the emergency valve parts of the new equipment to back-dump position when an emergency application of the brakes is being effected. The peculiarities in the train brake equipment which have a tendency to cause such undesired action and the resulting disadvantages when such action does occur will now be described.

In the new type of brake equipment such as disclosed in the aforementioned application and in the present application, the quick action valve device is timed to remain open for approximately one minute after an emergency application of the brakes is initiated, so as to completely vent the brake pipe. Where each car of a train is equipped with the new brake equipment and in some combinations of the old and new equipments, the brake pipe will be completely vented within this period of time. It has however, been found that, in the combination of old and new equipments aforementioned as well as in numerous other combinations, fluid under pressure which may be in the brake pipe on cars equipped with the old equipment, may not be completely released during the period of time that the vent valve devices of the new equipment remain open, with the result that when the vent valves are closed, fluid under pressure which may be in the brake pipe of the cars equipped with the old equipment will flow to the brake pipe on the cars equipped with the new apparatus and increase the brake pipe pressure on these cars. In some cases this increase in brake pipe pressure on the cars equipped with the new equipment may be at such a rapid rate as to cause the parts of the emergency valve devices to move to their inner or back-dump position in which the emergency reservoirs are closed off from the brake cylinders and fluid under pressure flows from the brake cylinders and auxiliary reservoirs to the brake pipe. This is of course very objectionable for the reason that it materially decreases the brake cylinder pressure.

Another object of the invention is to provide novel means for preventing the above mentioned undesired back-dump of fluid under pressure from the auxiliary reservoir and brake cylinder to the brake pipe in effecting an emergency application of the brakes.

Other objects and advantages of the invention will appear in the following more detailed description of the invention.

In the accompanying drawings; Fig. 1 is a diagrammatic view, mainly in section, of a fluid pressure brake equipment embodying the invention, the various parts of the equipment being shown in normal release position; and Fig. 2 is a similar view showing the various parts of the equipment in emergency application position.

As shown in the drawings, the fluid pressure brake equipment may be of the type disclosed in the aforementioned Farmer application, and comprises a brake controlling mechanism 1, an auxiliary reservoir 2, an emergency reservoir 3, a brake pipe 4, a release insuring valve device 5, a quick service modifying or limiting valve device 6, a reservoir release valve device 7, a quick action valve device 8, an emergency inshot valve device 9, a timing valve device 10, a strainer device 11, a double check valve device 12 and a brake cylinder 13.

The brake controlling valve mechanism 1 comprises a triple valve device 14, an emergency valve device 15 and a pipe bracket 16 to which the triple valve casing and emergency valve casing are secured in any desired manner.

The equipment also comprises a back-dump controlling valve device 17 which is associated with the emergency valve device 15 and which is adapted to prevent back-dump of fluid under pressure from the brake cylinder and auxiliary reservoir to the brake pipe unless the brake pipe pressure has been increased to about twenty pounds, even though the emergency valve parts have been shifted to their back-dump position. The purpose of this valve device, as will hereinafter more fully appear, is to prevent the back-dump of fluid from the brake cylinder and auxiliary reservoir to the brake pipe when an emergency application of the brakes is being effected.

With the exception of the back-dump controlling valve device 17 and certain back-dump insuring features of the emergency valve device 15 and the novel release insuring feature, all of which will hereinafter be more fully described, the various parts and devices of the equipment are of substantially the same construction and function in substantially the same manner, in controlling the application and release of the brakes, as the corresponding parts and devices of the equipment disclosed in the aforementioned Farmer application. Due to this and for the purpose of simplifying the present specification, a detailed description of various functions and details of construction of the equipment will be omitted.

The triple valve device 14 may comprise a casing having a chamber 18 containing a piston 19 provided with a stem 20 adapted to operate a main slide valve 21 and an auxiliary slide valve 22 contained in a valve chamber 23 which is connected to the auxiliary reservoir 2 through a passage 24 and a branch passage and pipe 25, said passage 24 leading to a valve chamber 26 which contains the auxiliary reservoir release valve 27 of the valve device 7.

The valve chamber 23 is closed at one end by a cap 28 which has a recess formed therein open to the valve chamber. This recess is of greater diameter than that of the major portion of the valve chamber, and due to this the rear end of the triple valve casing serves as a stop shoulder against which a stop member 29, contained in the recess and slidably mounted in the cap, is adapted to abut to limit inward movement of the stop member. Interposed between and engaging the stop member 29 and the cap 28 is a spring 30 which, at all times, tends to move the stop member toward the stop shoulder.

The rear end portion of the piston stem 20 extends through a central opening in the stop member 29 and is slidably guided by an annular rib 31 carried by the cap 28. The piston stem, at a point located a short distance inwardly from its rear end, is provided with an operating collar or lug 32, one side of which is adapted to operatively engage a rear end surface 33 of the main slide valve 21.

The rear end portion of the piston stem 20 is provided with a bore 34 which is closed at one end by a plug 35 having screw-threaded connection with the stem, said plug being provided with a central bore 36. Below the lower surface of the major portion of the stem, the other end of the bore 34 is open. The inner end wall of the bore 34 forms a stop shoulder adapted to be engaged by a plunger 37 which is in slidable engagement with the stem within the bore 34. This plunger is provided with a stem 38 which is slidably guided by the plug 35 within the bore 36.

Interposed between and engaging one side of the plunger 37 and plug 35 is a spring 39 which acts to normally maintain the plunger in engagement with the end wall of the bore 34. In this position, the face of the plunger will be closer to the rear face 33 of the main slide valve than will be the outer face of the collar 32 of the piston stem, so that in effecting an application of the brakes, the plunger will engage the main slide valve and yieldably resist movement of the piston 19 and auxiliary slide valve 22 relative to the main slide valve 21 before the collar 32 engages the main slide valve. The purpose of this, as fully described in the aforementioned Farmer application, is to stabilize the action of the triple valve parts. This stabilizing mechanism also acts to assist in breaking the seal between the piston 19 and a sealing gasket 40, clamped between the pipe bracket 16 and the casing of the triple valve device, in effecting a release of the brakes, and further serves as a graduating mechanism for shifting the piston to service lap position.

The emergency valve device 15 comprises a casing having a piston chamber 41 containing an emergency piston 42 provided with a stem 43 adapted to operate a main slide valve 44 and an auxiliary slide valve 45 contained in a valve chamber 46 which is connected, through a passage 47 and the passage in a choke plug 48, with a quick action chamber 49 formed in the pipe bracket 16.

A cap 50 is secured to the rear end of the casing of the emergency valve device and has an annular recess formed therein which constitutes a portion of the emergency valve chamber 46. This recess is of greater diameter than that of the major portion of the valve chamber. Due to this, the rear end of the casing forms a stop shoulder 51 against which a stop member 52, slidably mounted in the cap 50, is adapted to abut to limit the inward movement of the stop member 52. Interposed between and engaging the cap 50 is a spring 53 which at all times tends to move the member 52 toward the stop shoulder 51.

The rear end portion of the emergency piston stem 43 extends through a central opening in the member 52 and is slidably guided by an annular rib 54 carried by the cap 50.

The stem 43, at a point located a short distance inwardly from its rear end, is provided with an operating collar or lug 55, one side of which is adapted to be operatively engaged by the stop member 52 and the other side of which is adapted to operatively engage a rear end surface of the main slide valve 44.

The rear end portion of the emergency piston stem carries a mechanism which, in construction, is quite similar to the stabilizing mechanism carried by the rear end portion of the triple valve piston stem 20, and comprises a plunger 56 which is subject to the pressure of a spring 57 interposed between and engaging the plunger and a plug 58 having screw-threaded connection with the stem 43. The plunger is slidably guided within a bore 59 provided in the piston stem 43, and has a stem 60 which is slidable within a bore 61 provided in the plug 58. This mechanism is adapted to cooperate with the main slide valve 44 to assist in shifting the emergency piston 42 out of sealing engagement with a gasket 62 interposed between the triple valve casing and the pipe bracket 16, in releasing the brakes after an emergency application.

Formed in the pipe bracket 16 are a plurality of fluid conducting passages which are open to the several clamping faces of the bracket where they are adapted to register with corresponding passages formed in the several devices carried by the bracket. There is also formed in the pipe bracket 16 a chamber 63 which contains the strainer device 11.

The brake pipe 4 is normally open to the chamber 63 by way of a pipe and passage 64. Normally the chamber 63 is in communication with both the triple valve piston chamber 18 and the emergency piston chamber 41 through the straining material of the strainer device 11. If the strainer device should happen to become clogged, the double check valve device 12, which is mounted in the triple valve casing, will by-pass fluid around the strainer device in the same manner as fully described in the aforementioned Farmer application.

The release insuring valve device 5 is for the purpose of venting fluid under pressure from the auxiliary reservoir 2 when, in releasing the brakes, brake pipe pressure is increased to a predetermined degree in excess of auxiliary reservoir pressure, so as to facilitate the movement of the triple valve piston 19 and associated slide valves 21 and 22 to release position. Briefly described, this device comprises a flexible diaphragm 65, at one side of which there is a chamber 66 open, by way of the double check valve device 12, to the chamber 63 and consequently to the brake pipe 4, and at the other side there is a chamber 67 open, through a passage 68 to the valve chamber 23 of the triple valve device. Contained in the chamber 67 is a valve 69 which is operative to control communication from the chamber 67 to a vent passage 70 leading to the seat of the main slide valve 21 of the triple valve device, said valve being normally maintained closed by a spring 71. The flexible diaphragm is subject, as will be understood, to the opposing pressures of the brake pipe and auxiliary reservoir and is operable to control the operation of the valve 69.

The quick service modifying or limiting valve device 6 is carried by the casing of the triple valve device 14 and is for the purpose of limiting the local quick service reduction in brake pipe pressure according to a predetermined increase in brake cylinder pressure to insure the development of a predetermined but light brake cylinder pressure upon the effecting of a light reduction in brake pipe pressure by the use of the usual brake valve device (not shown), so as to prevent slack in the train from running in harshly.

The reservoir release valve device 7 is carried by the casing of the triple valve device 14 and comprises the auxiliary reservoir release valve 27 and an emergency reservoir release valve 72 and also comprises manually operable means for actuating said valves to vent fluid under pressure from one or both of said reservoirs to effect a release of the brakes independently of the engineer's brake valve device under certain train operating conditions.

The quick action vent valve device 8 is associated with the emergency valve device 15 and is mounted in the emergency valve casing. Briefly described, this device may comprise a vent valve 73 which is contained in a chamber 74 constantly connected, through a passage 75, to chamber 63, and also comprises a piston 76 adapted to control the operation of the valve 73 to open and close a communication 77 from the chamber 74 to the atmosphere, said valve being normally maintained closed by the action of a coil spring 78. At one side of the piston 76 there is a chamber 79 which is constantly open to a passage 80 leading to the seat of the emergency main slide valve 44. At the other side of the piston there is a chamber 81 which is open, by way of the communication 77, to the atmosphere.

The quick action piston chamber 79 is constantly in communication with chamber 81 and consequently with the atmospheric communication 77 through a small port 82 in the piston and with the piston in its normal position, as shown in Fig. 1, the chamber 79 is open through a leakage groove 83 to the chamber 81 and atmospheric communication 77. The purpose of the small port 82 is to control the rate of flow of fluid from the emergency valve chamber 46 and connected quick action chamber 49 to the atmosphere, so as to insure the vent valve 95 remaining open for a predetermined period of time. The leakage groove 83, when the quick action piston is in its normal position, provides for the rapid discharge of fluid from the piston chamber 79, so as to prevent the development of sufficient pressure in said chamber to cause the piston 76 to move to its valve unseating position in the event of leakage of fluid to the chamber by way of passage 80.

The inshot valve device 9 is contained within the casing of the emergency valve device 15 and functions, in effecting an emergency application of the brakes, to provide an initial inshot of fluid to the brake cylinder until a predetermined brake cylinder pressure is developed and then functions to restrict the rate of flow of fluid to the brake cylinder.

The timing valve device 10 is contained within the casing of the emergency valve device and operates, in effecting an emergency application of the brakes, to supply a final inshot of fluid to the brake cylinder at a predetermined time after the valve device 9 functions to retard the increase in brake cylinder pressure.

The back-dump controlling valve device 17 is mounted on the casing of the emergency valve and functions to prevent back-dump of fluid under pressure from the brake cylinder and auxiliary reservoir when, in effecting an emergency application of the brakes, the emergency valve parts are accidentally shifted to back-dump position. This valve device may comprise a flexible diaphragm valve 85 which is adapted to be moved into and out of engagement with an annular valve seat 86, formed on a bushing 87 securely mounted in the casing, to respectively open and close communication from a back-dump passage 88 to a chamber 89 at one side of the diaphragm valve which is connected through a passage 90 to the passage 75 open to the brake pipe by way of chamber 63 and passage and pipe 64, flow of fluid from the chamber 89 to the passage 88, when the diaphragm valve is in its open position, being prevented by a ball check valve 91. At the other side of the diaphragm valve 85 there is a chamber 92 which is open through a passage 93 to the atmosphere and which contains a follower member 94 through the medium of which a spring 95, also contained in chamber 92, is adapted to act to exert a seating pressure on the diaphragm valve.

The equipment may further comprise the usual brake cylinder pressure retaining valve device 96.

The foregoing description has been limited more or less to the details of construction of the various parts of the equipment and the following description will be directed more particularly to the functioning of said parts in controlling the brakes.

It will here be understood that, with the exception of releasing the brakes after an emergency application, the equipment functions to control the brakes in substantially the same manner as the equipment covered in the aforementioned Farmer application, and in view of this, the following description will be limited to the operations which differ from those set forth in said application.

*Emergency application of the brakes*

With the equipment fully charged and the various parts thereof in their normal release position as shown in Fig. 1 of the drawings, and it is desired to effect an emergency application of the brakes, an emergency reduction in brake pipe pressure is effected which causes the several parts of the triple valve device 14 to be shifted to application position and the parts of the emergency valve device 15 to be shifted to emergency position.

With the various parts of the triple valve device 14 and emergency valve device 15 in application position, fluid under pressure is supplied from both the auxiliary reservoir 2 and emergency reservoir 3 to the brake cylinder 13, the flow of fluid from the auxiliary reservoir being by way of pipe and passage 25, passage 24, valve chamber 23 of the triple valve device, a service port 97 in the triple valve main slide valve 21, a passage 98, a branch passage 99, through the emergency inshot valve device 9, a passage 100 and a passage and pipe 101, and the flow of fluid from the emergency reservoir being by way of a pipe and passage 102, a cavity 103 in the emergency main slide valve 44 and passages 104, 105 and 99. When the timing valve 106 of the timing valve device 10 is moved to its open position by fluid at brake cylinder pressure, there is an additional flow of fluid from the auxiliary and emergency reservoirs by way of passage 105, timing valve chamber 107 and passage 101.

With the main emergency slide valve 44 in emergency position, the passage 80 is uncovered, so that fluid under pressure from the emergency valve chamber 46 flows through this passage to the quick action piston chamber 79, causing the quick action piston 76 to operate to unseat the vent valve 73 against the opposing pressure of the spring 78. As the piston is thus moved it first closes the leakage groove 83 and then, as it nears its innermost position, it engages the annular seat rib 108 of a sealing gasket 109 mounted in the casing. With the piston in this position the pressure of fluid in the emergency valve chamber 46, quick action chamber 49 and quick action piston chamber 79 is reduced by the flow of fluid to the atmosphere by way of the port 82 in the quick action piston.

With the vent valve unseated, fluid under pressure is vented from the brake pipe to the atmosphere, and when the brake pipe pressure reduces due to such venting, to around twenty pounds, the spring 95 of the back-dump controlling valve device 17, acting through the medium of the follower 94, causes the diaphragm valve 85 to engage the valve seat 86, thus closing communication from the back-dump passage 88 to the chamber 89 which is in open communication with the brake pipe.

As hereinbefore mentioned the quick action valve device 8 is timed to remain open for approximately one minute after an emergency application of the brakes is initiated so as to completely vent the brake pipe. However, in a train of cars where the old and new equipments happen to be disposed in such a manner that fluid under pressure in the brake pipe on cars equipped with the old equipment may flow to the brake pipe on the cars having the new equipment after the vent valve devices 8 are closed, and the resulting increase in brake pipe pressure may be sufficient to move some of the emergency valve parts to their inner or back-dump position in which the passage 104 which is in open communication with the brake cylinder and auxiliary reservoir is connected through the cavity 103 in the emergency main slide valve 44 to the back-dump passage 88. When the emergency piston and associated slide valves 44 and 45 are thus unintentionally moved to their back-dump position, the diaphragm valve 85 which has been previously seated will prevent fluid from flowing from the passage 88 and consequently from the brake cylinder and auxiliary reservoir to the brake pipe. It has been found that this unintentional increase in brake pipe pressure will not equal twenty pounds and due to this, the value of the spring 95 may be such that it will maintain the diaphragm valve 85 seated until the brake pipe pressure in chamber 89 is increased to twenty pounds. Since, as just mentioned an accidental increase in brake pipe pressure will not equal twenty pounds, the back-dump controlling valve will prevent the back-dump of fluid under pressure from the brake cylinder and auxiliary reservoir when in effecting an emergency application of the brakes the emergency piston and associated slide valves 44 and 45 are unintentionally moved to their inner or back-dump position.

*Release of the brakes after an emergency application*

To effect a release of the brakes after an emergency application, fluid under pressure is supplied to the brake pipe 4 in the usual manner and flows to the triple valve piston chamber 18 and to the emergency piston chamber 41. Fluid in the triple valve chamber 23 is at reduced auxiliary reservoir pressure and fluid in the emergency valve chamber 46 is at atmospheric pressure. Since the chamber 45 is at atmospheric pressure, the emergency piston will move inwardly, i. e., in a direction toward the left hand, upon a slight increase in brake pipe pressure, bringing the collar 55 on the rear end portion of the emergency piston stem 43 into engagement with the forward end of the stop 52 and shifting the emergency slide valves 44 and 45 toward release position. Just prior to the engagement between the piston stem and the stop 52, the piston uncovers the port in the choke plug 48 so that fluid under pressure now flows from the emergency piston chamber 41 to the emergency valve chamber 46 and quick action chamber by way of passage 47. The value of the spring 53 which yieldably opposes movement of the stop 52 by the piston stem is just sufficient to shift the emergency piston and associated slide valves 44 and 45 from their inner release or back-dump position to their normal position and the flow area of the port in the choke plug is small, so that a further slight increase in brake pipe pressure will cause the piston and slide valves to move to back-dump position in which the cavity 103 in the main emergency slide valve 44 establishes communication from the brake cylinder passage 104 to the back-dump passage 88. It will here be noted that due to the retardation of the flow of fluid through the choke plug 48 and to the fact that the spring 52 is of low value, movement of the emergency piston and slide valves to their back-dump position will be insured. However, in some combinations of old and new equipments, such as has hereinbefore been mentioned, the flow of fluid to the emergency piston chamber 46 and quick action chamber 49 by way of the port in the choke plug 48 on the rear cars of the train may be at as fast a rate as fluid is supplied to the brake pipe, so that on the rear cars the several parts of the emergency valve device will not be shifted to their back-dump position.

It will here be understood that on the head cars of the train where the increase is at a fast rate, the several parts of each emergency valve device will be promptly shifted to their inner or back-dump position. On the rear cars where the increase in brake pipe pressure is slow the several parts of the emergency valve devices may be brought to a stop in their normal release position as hereinbefore mentioned.

With the several parts of an emergency valve device in back-dump position, the cavity 103 in the emergency main slide valve 44 connects the passage 104 to the back-dump passage 88.

The brake cylinder is open to the passage 104 by way of pipe and passage 101, past the open valve of the timing valve device 10 and passage 105, and with the triple valve device still in application position, the auxiliary reservoir is open to said passage 104 by way of pipe and passage 25, passage 24, triple valve chamber 23, the service port 97 in the triple valve main slide valve 21, and passages 98 and 105. When the brake pipe pressure has been increased to about twenty pounds, fluid at this pressure in diaphragm valve chamber 89, causes the diaphragm valve 85 to flex out of seating engagement with the valve seat 86 against the opposing pressure of the spring 95. Since the passage 104 is in open communication with the passage 88 and the diaphragm valve 85 is in its open position, fluid under pressure flows from the brake cylinder and auxiliary reservoir to the brake pipe by way of passage 104, cavity 103, passage 88, past the ball check valve 91 and open diaphragm valve 85, diaphragm valve chamber 89, passages 90 and 75, strainer chamber 63, and passage and pipe 64.

The back dumping of fluid from the brake cylinder and auxiliary reservoir effects several very desirable results; first, it serves to save fluid under pressure which would otherwise be lost to the atmosphere; second, it rapidly increases the brake pipe pressure and therefore hastens the recharging the equipment on a train after an emergency application of the brakes; and further, by reducing auxiliary reservoir pressure to a low degree, substantially to equalization with the brake pipe, it tends to facilitate movement of the triple valve parts to their release position.

When, in releasing the brakes, the brake pipe pressure in chamber 66, at one side of the flexible diaphragm 65 of the release insuring valve device 5, exceeds the auxiliary reservoir pressure in chamber 67 by about one and one-half pounds, said diaphragm will flex inwardly and cause the valve 69 to be unseated. The triple valve piston 19 and associated slide valves 21 and 22 are intended to move from application position to release position when the brake pipe pressure in the triple valve piston chamber 18 exceeds auxiliary reservoir pressure in the triple valve slide valve chamber 23 by about one and one-quarter pounds, so that the main slide valve 21 will lap the passage 70 before the release insuring valve 69 is unseated. With the passage 70 lapped, fluid under pressure will not be released from the auxiliary reservoir through the medium of the release insuring valve device. If, however, a greater pressure differential is required to move the triple valve piston to release position than is required to unseat the valve 69, the valve will be unseated before the triple valve piston moves from application to release position, and since in the application position of the triple valve main slide valve 21, the passage 70 is open to the atmosphere through a cavity 110 in the main slide valve 21, a brake cylinder exhaust passage and pipe 111 and retaining valve device 96, fluid under pressure will flow from the triple valve slide valve chamber 23 and connected auxiliary reservoir 2 to the passage 70 by way of passage 68, chamber 67, past the unseated valve 69 and then to the atmosphere, there being a choke 112 interposed in the passage 70 provided for retarding the flow of fluid from the valve chamber 23.

On the head fifty cars of the train, where the increase in brake pipe pressure is at a fast rate and when this rate of increase is accelerated by the back-dump of fluid under pressure from the brake cylinder and auxiliary reservoir to the brake pipe, the triple valve parts are caused to promptly move to their release positions in which the cavity 110 in the main slide valve 21 connects the passage 98 to the passage 111 leading to the atmosphere, and fluid flows through this communication from the brake cylinder and as a result the release of the brakes is effected. If for any reason any of the triple valve devices on these cars should have a tendency to be slow in starting to move toward application position, the release insuring valve device will function, as hereinbefore described, to release fluid under pressure from the auxiliary reservoir, thus insuring the prompt movement of the parts of such triple valve devices to release position.

With the triple valve devices on the cars at the head end of the train in their release position fluid under pressure flows from the brake pipe to the auxiliary reservoir by way of the triple valve piston chamber 18, a feed groove 113, triple valve slide valve chamber 23, passage 24 and passage and pipe 25. From the valve chamber 23 fluid under pressure also flows to the emergency reservoir by way of a port 114 in the triple valve main slide valve 21, a passage 115 and passage and pipe 102. Due to this flow of fluid to the auxiliary and emergency reservoirs and to the old equipments acting to retard the rate of increase in brake pipe pressure on the rear cars of the train, the rate of increase in brake pipe pressure on the rear cars will be very slow.

It is well known that there will be leakage of fluid from the triple valve piston chamber 18 past the triple valve piston 19 to the valve chamber 23 before the piston opens the feed groove 113 and in order to prevent this leakage from increasing the pressure of fluid in the valve chamber 23 and auxiliary reservoir 2 at such a rapid rate as to prevent the creation of a sufficient fluid pressure differential on the triple valve piston to cause the triple valve piston to move to release position, a passage 116 is provided through which the auxiliary release valve chamber 26 is connected to the passage 115 which is in constant open communication with the emergency reservoir 3. Interposed in the passage 116 are check valves 117 and 118 which are arranged in series with each other and which are adapted to prevent flow of fluid from the emergency reservoir 3 to the triple valve slide valve chamber 23 and auxiliary reservoir 2.

It will be seen that by the addition of the volume of the emergency reservoir to the auxiliary reservoir 2 and triple valve slide valve chamber 23, a fluid pressure differential sufficient to cause the triple valve piston to move to release position will be more readily obtained than if the flow of fluid past the piston were to the auxiliary reservoir and valve chamber 23 only, thus insuring the movement of the triple valve parts on the rear cars of the train to release position. It will also be noted that this retardation of the rate of increase in the piston chamber 23 and auxiliary reservoir also renders the release insuring valve device 5 more readily operable to release fluid under pressure from the auxiliary reservoir than would otherwise be the case, thus, on the rear cars of the train, insuring the operation to release position of any triple valve device which has a tendency to remain in application position.

It will be understood from the foregoing description of the invention that the emergency valve device will readily move to its back-dump position upon the creation of a light fluid pressure differential on the emergency piston and that the back-dump controlling valve device will prevent the back-pump of fluid from the brake cylinder and auxiliary reservoir when the several parts of the emergency valve device are unintentionally moved to their back-dump position in effecting an emergency application of the brakes. It will also be understood that by retarding the rate of increase in the pressure of fluid in the triple valve slide valve chamber by permitting fluid, which may leak past the triple valve piston, to flow to both the auxiliary and emergency reservoirs, a pressure differential for effecting the operation of triple valve devices to release position and for effecting the operation of the release insuring valve devices to release fluid under pressure from the auxiliary reservoirs insured, particularly on the cars at the rear end of the train where the increase in brake pipe pressure in releasing the brakes is very slow.

While one illustrative embodiment of the invention has been described in detail, it is not our intention to limit its scope to that embodiment or otherwise than by the terms of the appended claims.

Having now described our invention, what we claim as new and desire to secure by Letters Patent, is:

1. In a fluid pressure brake, the combination with a brake pipe, of valve means having a release position in which fluid under pressure is adapted to be supplied to the brake pipe, said valve means being movable upon a reduction in brake pipe pressure for initiating a braking operation and being movable to said release position upon an increase in brake pipe pressure, and fluid pressure responsive means for preventing the flow of fluid to the brake pipe when the valve means is in said release position, until the brake pipe pressure has been increased a predetermined amount above that required to effect the movement of the valve means to said release position.

2. In a fluid pressure brake, the combination with a brake pipe, of valve means having a release position in which a communication is established through which fluid under pressure is adapted to be supplied to the brake pipe, said valve means being movable upon a reduction in brake pipe pressure for initiating a braking operation and movable upon an increase in brake pipe pressure to said release position, and fluid pressure responsive means conditioned in effecting a reduction in brake pipe pressure to maintain said communication closed, when the valve means is in said release position, until the brake pipe pressure has been increased a predetermined amount above that required to move the valve means to said release position.

3. In a fluid pressure brake, the combination with a brake pipe and a brake cylinder, of a valve mechanism movable upon a reduction in brake pipe pressure to a brake applying position in which fluid under pressure is supplied to the brake cylinder and movable upon an increase in brake pipe pressure to a brake releasing position in which a communication is established through which fluid under pressure is adapted to be vented from the brake cylinder to the brake pipe, and fluid pressure responsive means for preventing the flow of fluid from the brake cylinder to the brake pipe through said communication until the brake pipe pressure has been increased to a predetermined degree above that required to effect the movement of said valve mechanism to said brake releasing position.

4. In a fluid pressure brake, the combination with a brake pipe and a brake cylinder, of a valve mechanism movable upon a reduction in brake pipe pressure to a brake applying position in which fluid under pressure is supplied to the brake cylinder and movable upon an increase in brake pipe pressure to a brake releasing position in which a communication is established through which fluid under pressure is adapted to be vented from the brake cylinder to the brake pipe, and fluid pressure responsive means closing the communication, said means being subject on one side to brake pipe pressure and responsive only to a higher brake pipe pressure than that required to effect the movement of the valve mechanism to said brake releasing position for permitting the flow of fluid from the brake cylinder to the brake pipe through the communication.

5. In a fluid pressure brake, the combination with a brake pipe and a brake cylinder, of a valve mechanism movable upon a reduction in brake pipe pressure to a brake applying position in which fluid under pressure is supplied to the brake cylinder and movable upon an increase in brake pipe pressure to a brake releasing position in which a communication is established through which fluid under pressure is adapted to be vented from the brake cylinder to the brake pipe, and means for preventing the flow of fluid through said communication unless the brake pipe pressure has been increased above that required to effect the movement of the valve mechanism to said brake releasing position, said means being subject to brake pipe pressure and an opposing pressure.

6. In a fluid pressure brake, the combination with a brake pipe and a brake cylinder, of a valve mechanism movable upon a reduction in brake pipe pressure to a brake applying position in which fluid under pressure is supplied to the brake cylinder and movable upon an increase in brake pipe pressure to a brake releasing position in which a communication is established through which fluid under pressure is adapted to be vented from the brake cylinder to the brake pipe, and means subject to brake pipe pressure and movable upon a reduction in brake pipe pressure to a position for preventing the flow of fluid from the brake cylinder to the brake pipe when the valve mechanism is in said brake releasing position until the brake pipe pressure is increased above that required to effect the movement of the valve mechanism to said brake releasing position.

7. In a fluid pressure brake, the combination with a brake pipe and a brake cylinder, of a valve mechanism movable upon a reduction in brake pipe pressure to a brake applying position in which fluid under pressure is supplied to the brake cylinder and movable upon an increase in brake pipe pressure to a brake releasing position in which a communication is established through which fluid under pressure is adapted to be vented from the brake cylinder to the brake pipe, and means subject to brake pipe pressure and movable upon a reduction in brake pipe pressure to a position for preventing the flow of fluid from the brake cylinder to the brake pipe when the valve mechanism is in said brake releasing position and movable only upon an increase in brake pipe pressure above that required to effect the movement of the valve mechanism to said brake releasing position to permit the flow of fluid from the brake cylinder to the brake pipe through said communication.

8. In a fluid pressure brake, the combination with a brake pipe and a brake cylinder, of a valve mechanism movable upon a reduction in brake pipe pressure to a brake applying position in which fluid under pressure is supplied to the brake cylinder and movable upon an increase in brake pipe pressure to a brake releasing position in which a communication is established through which fluid under pressure is adapted to be vented from the brake cylinder to the brake pipe, and fluid pressure responsive valve means operable separately from said valve mechanism upon an increase in brake pipe pressure for controlling the flow of fluid from the brake cylinder to the brake pipe through said communication when the valve mechanism is in said brake releasing position.

9. In a fluid pressure brake, the combination with a brake pipe and a brake cylinder, of a valve mechanism movable upon a reduction in brake pipe pressure to a brake applying position in which fluid under pressure is supplied to the brake cylinder and movable upon an increase in brake pipe pressure to a brake releasing position in which a communication is established through which fluid under pressure is adapted to be vented from the brake cylinder to the brake pipe, and fluid pressure responsive valve means operable separately from said valve mechanism and only upon an increase in brake pipe pressure above that required to effect the movement of the valve mechanism to said brake releasing position for permitting the flow of fluid from the brake cylinder to the brake pipe through said communication.

10. In a fluid pressure brake, the combination with a brake pipe and a brake cylinder, of a valve mechanism movable upon a reduction in brake pipe pressure to a brake applying position in which fluid under pressure is supplied to the brake cylinder and movable upon an increase in brake pipe pressure to a brake releasing position in which a communication is established through which fluid under pressure is adapted to be vented from the brake cylinder to the brake pipe, and fluid pressure responsive valve means interposed in said communication for preventing the flow of fluid from the brake cylinder to the brake pipe when the valve mechanism is in said brake releasing position until the brake pipe pressure has been increased a predetermined amount above that required to effect the movement of the valve mechanism to said brake releasing position.

11. In a fluid pressure brake, the combination with a brake pipe and a brake cylinder, of a valve mechanism movable upon a reduction in brake pipe pressure to a brake applying position in which fluid under pressure is supplied to the brake cylinder and movable upon an increase in brake pipe pressure to a brake releasing position in which a communication is established through which fluid under pressure is adapted to be vented from the brake cylinder to the brake pipe, and valve means interposed in said communication for preventing the flow of fluid from the brake cylinder to the brake pipe when the valve mechanism is in said brake releasing position until the brake pipe pressure has been increased a predetermined amount above that required to effect the movement of the valve mechanism to said brake releasing position, said valve means comprising a valve and a spring for moving said valve to its communication closing position upon a reduction in brake pipe pressure in initiating an application of the brakes.

12. In a fluid pressure brake, the combination with a brake pipe, of valve means having a release position in which fluid under pressure is adapted to be supplied to the brake pipe, said valve means being movable upon a reduction in brake pipe pressure for initiating a braking operation and being movable to said release position upon an increase in brake pipe pressure, and means for preventing the flow of fluid to the brake pipe, when the valve means is in said release position, until the brake pipe pressure has been increased a predetermined amount above that required to effect the movement of the valve means to said release position, said means comprising a valve and a spring for moving said valve to its communication closing position upon the initiation of a brake application.

13. In a fluid pressure brake, the combination with a brake pipe and a brake cylinder, of a valve mechanism operated upon an emergency reduction in brake pipe pressure for supplying fluid under pressure to the brake cylinder to effect an application of the brakes and operated upon an increase in brake pipe pressure to release fluid under pressure from the brake cylinder, means included in said valve mechanism movable upon an increase in brake pipe pressure to a release position for establishing a communication through which fluid under pressure is adapted to flow from the brake cylinder to the brake pipe, and brake pipe pressure responsive valve means for preventing the flow of fluid through said communication until the brake pipe pressure has been increased above that required to effect the movement of said valve mechanism to release position.

14. In a fluid pressure brake, the combination with a brake pipe, a brake cylinder and valve mechanism operated upon an emergency reduction in brake pipe pressure for supplying fluid under pressure to the brake cylinder, of means included in said valve mechanism movable upon an increase in brake pipe pressure for establishing a communication through which fluid under pressure is adapted to be supplied from the brake cylinder to the brake pipe, and valve means closing said communication and operable by brake pipe pressure to permit the flow of fluid from the brake cylinder to the brake pipe only when the brake pipe pressure is increased to effect the release of an emergency application of the brakes.

15. In a fluid pressure brake, the combination with a brake pipe, of a valve mechanism having a normal brake releasing position, a brake applying position and an inner brake releasing position and operated from said normal position to the brake applying position upon an emergency reduction in brake pipe pressure and operated to either the normal position or inner release position upon an increase in brake pipe pressure, means establishing a communication through which fluid under pressure is adapted to flow to the brake pipe when the valve mechanism is in its inner release position, and pressure responsive means for maintaining said communication closed until the brake pipe pressure has been increased a predetermined amount above that required to move the valve mechanism to said inner release position.

16. In a fluid pressure brake, the combination with a brake pipe, a brake cylinder, an auxiliary reservoir, an emergency reservoir and a valve mechanism operative upon an emergency reduction in brake pipe pressure for supplying fluid under pressure from both of said reservoirs to the brake cylinder and operative upon an increase in brake pipe pressure to release fluid under pressure from the brake cylinder, of a constantly established communication through which fluid under pressure which may be supplied to the auxiliary reservoir before the valve mechanism is in release position is adapted to flow to the emergency reservoir in initiating the movement of said valve means toward release position, and means for preventing flow of fluid from the emergency reservoir to the auxiliary reservoir through said communication.

17. In a fluid pressure brake, the combination with a brake pipe, a brake cylinder, an auxiliary reservoir, an emergency reservoir and a valve mechanism operative upon an emergency reduction in brake pipe pressure for supplying fluid under pressure from both of said reservoirs to the brake cylinder and operative upon an increase in brake pipe pressure to release fluid under pressure from the brake cylinder, of a constantly established communication through which fluid under pressure which may leak from the brake pipe to the auxiliary reservoir before the valve mechanism is in release position may flow to the emergency reservoir, and means for preventing flow of fluid from the emergency reservoir to the auxiliary reservoir.

18. In a fluid pressure brake, the combination with a brake pipe, a brake cylinder, an auxiliary reservoir, a supplemental reservoir and a valve mechanism comprising a triple valve device and an emergency valve device operative upon an emergency reduction in brake pipe pressure for supplying fluid under pressure from both of said reservoirs to the brake cylinder, and operative upon an increase in brake pipe pressure to release fluid under pressure from the brake cylinder, of a release insuring valve device operable upon a predetermined increase in brake pipe pressure over auxiliary reservoir pressure for venting fluid under pressure from the auxiliary reservoir to facilitate the movement of the triple valve device to release position, a communication through which fluid under pressure which may leak from the brake pipe past said triple valve device to the auxiliary reservoir as the triple valve device is moved toward release position may flow to the supplemental reservoir for retarding the rate of increase in auxiliary reservoir pressure to thereby facilitate the creation of an operating fluid pressure differential on said triple valve device and release insuring valve device, and means for preventing flow of fluid from the supplemental reservoir to the auxiliary reservoir by way of said communication.

CLYDE C. FARMER.
ELLIS E. HEWITT.